(12) United States Patent
Nam (10) Patent No.: US 7,334,805 B2
(45) Date of Patent: Feb. 26, 2008

(54) WHEEL ANGLE ADJUSTMENT APPARATUS FOR AUTOMOBILE SUSPENSION SYSTEM

(75) Inventor: Duk-Woo Nam, Ulsan Metropolitan (KR)

(73) Assignee: Donghee Industrial Co., Ltd., Ulsan Metropolitan (KR)

( * ) Notice: Subject to any disclaimer, the term of this patent is extended or adjusted under 35 U.S.C. 154(b) by 247 days.

(21) Appl. No.: 11/133,276

(22) Filed: May 20, 2005

(65) Prior Publication Data

US 2006/0138740 A1 Jun. 29, 2006

(30) Foreign Application Priority Data

Dec. 23, 2004 (KR) .................. 10-2004-0110991

(51) Int. Cl.
*B62D 17/00* (2006.01)
(52) U.S. Cl. .................. 280/86.753; 280/86.751; 280/86.758; 301/132
(58) Field of Classification Search ............. 280/86.75, 280/86.751, 86.753, 86.754, 86.756, 86.758; 301/131–136; *B62D 17/00*
See application file for complete search history.

(56) References Cited

U.S. PATENT DOCUMENTS

| | | | | |
|---|---|---|---|---|
| 3,749,415 A | * | 7/1973 | Sampatacos | 280/124.136 |
| 4,462,241 A | * | 7/1984 | Whisenant | 72/458 |
| 4,693,487 A | * | 9/1987 | Cooper | 280/86.751 |
| 5,263,731 A | | 11/1993 | Deutschel | |
| 5,401,080 A | | 3/1995 | Wenzel | |
| 6,374,665 B1 | * | 4/2002 | Somppi et al. | 73/146 |
| 2003/0227151 A1 | * | 12/2003 | Schreiber et al. | 280/86.751 |
| 2004/0178595 A1 | * | 9/2004 | Coggin et al. | 280/86.758 |

FOREIGN PATENT DOCUMENTS

| | | |
|---|---|---|
| EP | 1 640 249 A1 * | 3/2006 |
| JP | 2000-25438 | 1/2000 |
| JP | 2000-85330 | 3/2000 |

* cited by examiner

*Primary Examiner*—Ruth Ilan
(74) *Attorney, Agent, or Firm*—Dickstein Shapiro LLP (57) ABSTRACT

Disclosed herein is a wheel angle adjustment apparatus for automobile suspension systems. The wheel angle adjustment apparatus of the present invention has a structure such that upper, lower, left and right gaps between a spindle bracket and a wheel bracket are changed by tightening or loosening a plurality of locking bolts that couples the spindle bracket and the wheel bracket together. Therefore, toe and camber angles of each wheel are easily adjusted by tightening or loosening the locking bolts. In particular, when the present invention is used in a suspension system such as a torsion beam suspension system which has a structure such that a wheel alignment using a connection part provided between the automobile body and wheels is impossible, the wheels are easily aligned merely by adjusting the gap between the spindle bracket and the wheel bracket.

7 Claims, 10 Drawing Sheets

WHEEL ANGLE ADJUSTMENT APPARATUS FOR AUTOMOBILE SUSPENSION SYSTEM

BACKGROUND OF THE INVENTION

1. Field of the Invention

The present invention relates generally to a wheel angle adjustment apparatus for an automobile suspension system and, more particularly, to a wheel angle adjustment apparatus for an automobile suspension system, which has a structure that allows toe and camber angles of wheels to be easily adjusted.

2. Description of the Related Art

As well known to those skilled in the art, a suspension system for an automobile is a device that couple wheels to an automobile body. A suspension system absorbs impact and vibration transferred from a road surface while the automobile is in motion, thus enhancing the riding comfort and stability of the automobile.

Such a suspension system is classified into a single body type suspension system, in which left and right wheels are integrally coupled to each other through an automobile axle, and an independent type suspension system, in which left and right wheels are independently operated. Conventional suspension systems include a spring to absorb shocks transferred from a road surface and a shock absorber that prevents free vibration of the spring, thus enhancing riding comfort and an arm or link to control the operation of the wheels.

In addition, there is a torsion beam suspension system, which is a unique hybrid of the single body type and the independent type. In the torsion beam suspension system, left and right trailing arms are coupled to each other by one unit that is called a torsion beam. The torsion beam suspension system is characterized in that the length of a link is longer than that of a strut suspension system and that of a double wishbone suspension system, and the number of bushings that may become an oscillating shaft is lower than that of the strut suspension system and that of the double wishbone suspension system.

Furthermore, the torsion beam suspension system can reduce friction hysteresis during movement of the suspension and provide a smooth comfortable ride. In addition, because it has a simple structure and a reduced number of elements, a high level of expertise is not required when designing the system, and the manufacturing costs and weight are reduced. Also, superior stability in driving the automobile is ensured. Therefore, conventional torsion beam suspensions have been used as rear suspension systems for small automobiles for many years.

Figure 1:
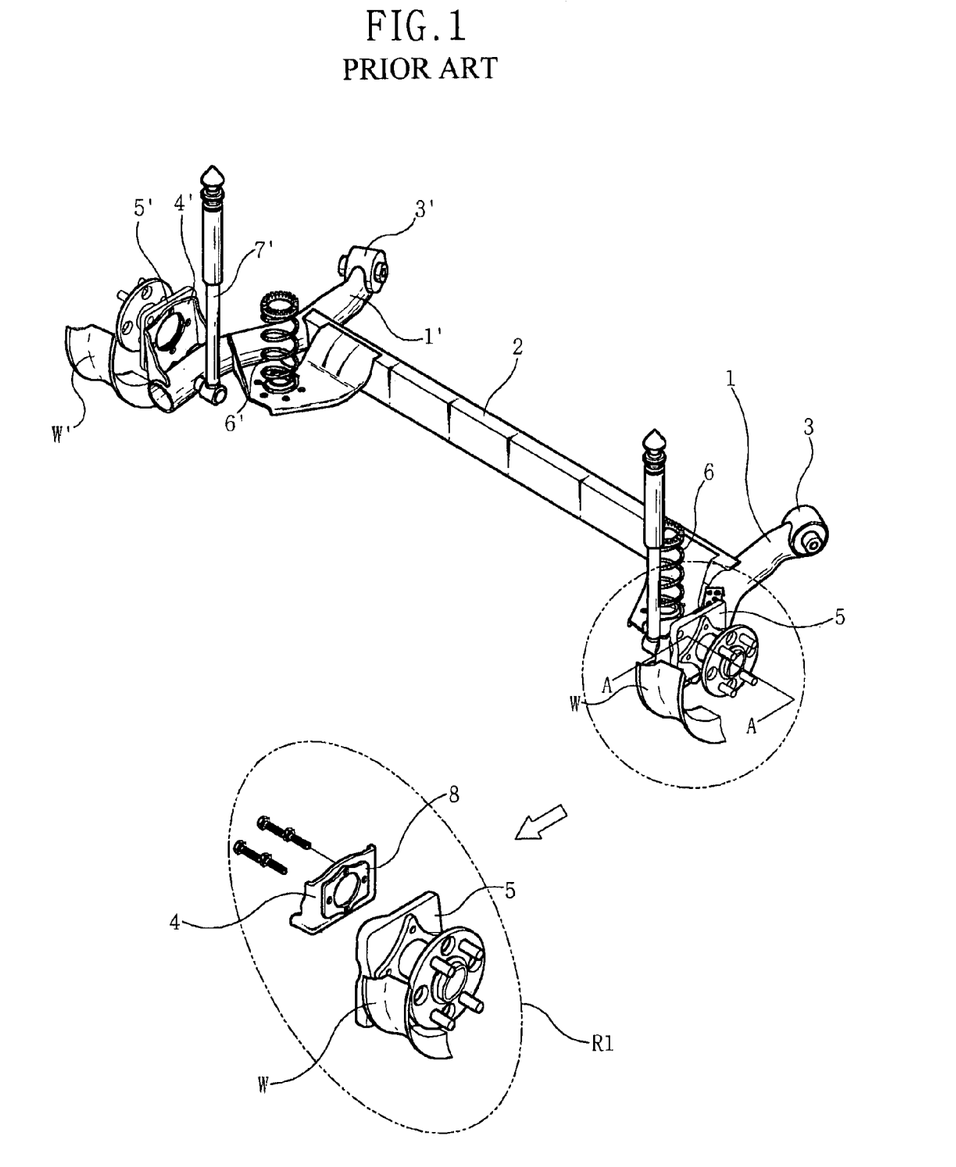
FIG. 1 is a perspective view showing a conventional torsion beam suspension system.

As shown in FIG. 1, in such a torsion beam suspension system, a pair of trailing arms 1 and 1' is coupled to each other by a torsion beam 2. A pair of joints 3 and 3', each having a bushing, is provided on front ends of the trailing arms 1 and 1', respectively. The front end of each trailing arm 1, 1' is pivotably mounted to an automobile body (not shown) through each joint 30, 30'.

Furthermore, a spindle bracket 4, 4' is welded to the rear end of each trailing arm 1, 1'. A wheel W, W' is coupled to each spindle bracket 4, 4' by a wheel bracket 5, 5'.

Moreover, a suspension spring 6, 6' is provided between the automobile body and each trailing arm 1, 1'. A shock absorber 7, 7' is provided on the rear end of each trailing arm 1, 1' at a position spaced apart from each spindle bracket 4, 4' by a predetermined distance.

Figure 2:
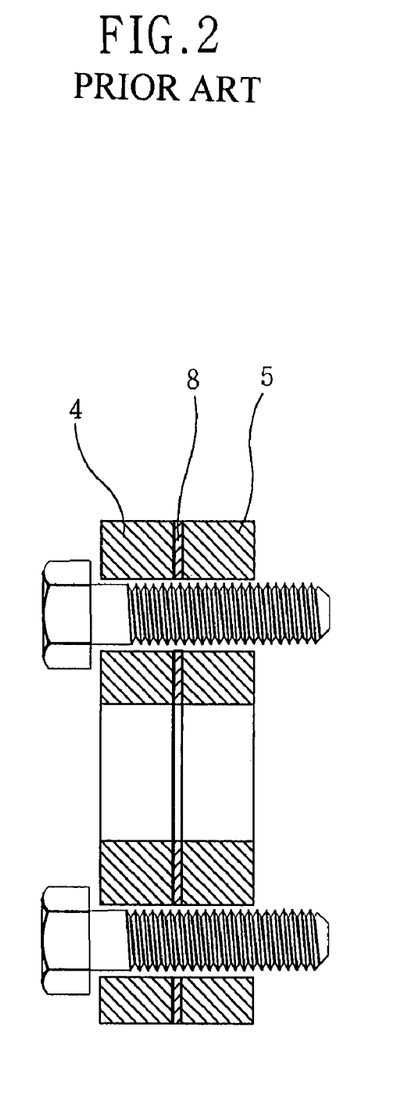
FIG. 2 is a sectional view taken along the line A-A of FIG. 1.

Referring to portion R1 of FIG. 1 and to FIG. 2, an interposition plate 8 is provided between each spindle bracket 4, 4' and each wheel bracket 5, 5'. The inclination of each wheel bracket 5, 5' from a lengthwise direction (with respect to the front and back of the automobile) and from a vertical direction (with respect to the height direction of the automobile) is adjusted by changing the thickness of the interposition plate 8 through cutting. Therefore, the toe angle and the camber angle of each wheel W, W' are determined.

For reference, a toe angle means an angle between the longitudinal axis of the automobile and each wheel, a front portion of which is angled inward or outward when viewing the automobile in a plan view. The toe angle of each wheel can be set to a previously designed value by adjusting the forward and backward angle of the associated interposition plate 8. The camber angle means an angle between the vertical axis of the automobile and each wheel, an upper portion of which is angled inward or outward. The camber angle can be set to a previously designed value by adjusting the vertical inclination of the associated interposition plate 8.

As such, in the conventional torsion beam suspension system having the above-mentioned structure, the front ends of the pair of trailing arms are pivotably mounted to the automobile body. However, the conventional torsion beam suspension system does not have a link serving to adjust the wheel alignment between the wheels and the automobile body, unlike other suspension systems (for example, multi-link suspension system). Therefore, the toe angle and camber angle, set when manufacturing an automobile, cannot be adjusted.

Thus, the conventional torsion beam suspension system is problematic in that if the wheel of an automobile having the conventional torsion beam suspension system becomes undesirably misaligned after the automobile is delivered from a warehouse, it is impossible to compensate for such wheel misalignment.

SUMMARY OF THE INVENTION

Accordingly, the present invention has been made keeping in mind the above problems occurring in the prior art, and an object of the present invention is to provide a wheel angle adjustment apparatus for automobile suspension systems in which the toe angle and camber angle of each wheel is easily adjusted by adjusting a gap between a spindle bracket and a wheel bracket.

In order to accomplish the above object, the present invention provides a wheel angle adjustment apparatus for an automobile suspension system provided with both a wheel bracket and a spindle bracket coupled to the wheel bracket, wherein the wheel angle adjustment apparatus includes: a slide coupling part having a rounded shape and protruding as one body from either a surface of the spindle bracket facing the wheel bracket or a surface of the wheel bracket facing the spindle bracket; a holding region provided on a remaining one of the surface of the spindle bracket facing the wheel bracket and the surface of the wheel bracket facing the spindle bracket, so that the slide coupling part is rotatably seated in the holding region; a plurality of locking bolts tightened into both the spindle bracket and the wheel bracket to couple the spindle bracket and the wheel bracket together; and an elastic spacer provided on each of the plurality of locking bolts between the spindle bracket and the wheel bracket.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Hereinafter, a preferred embodiment of the present invention will be explained in detail with reference to the attached drawings.

Figure 3:
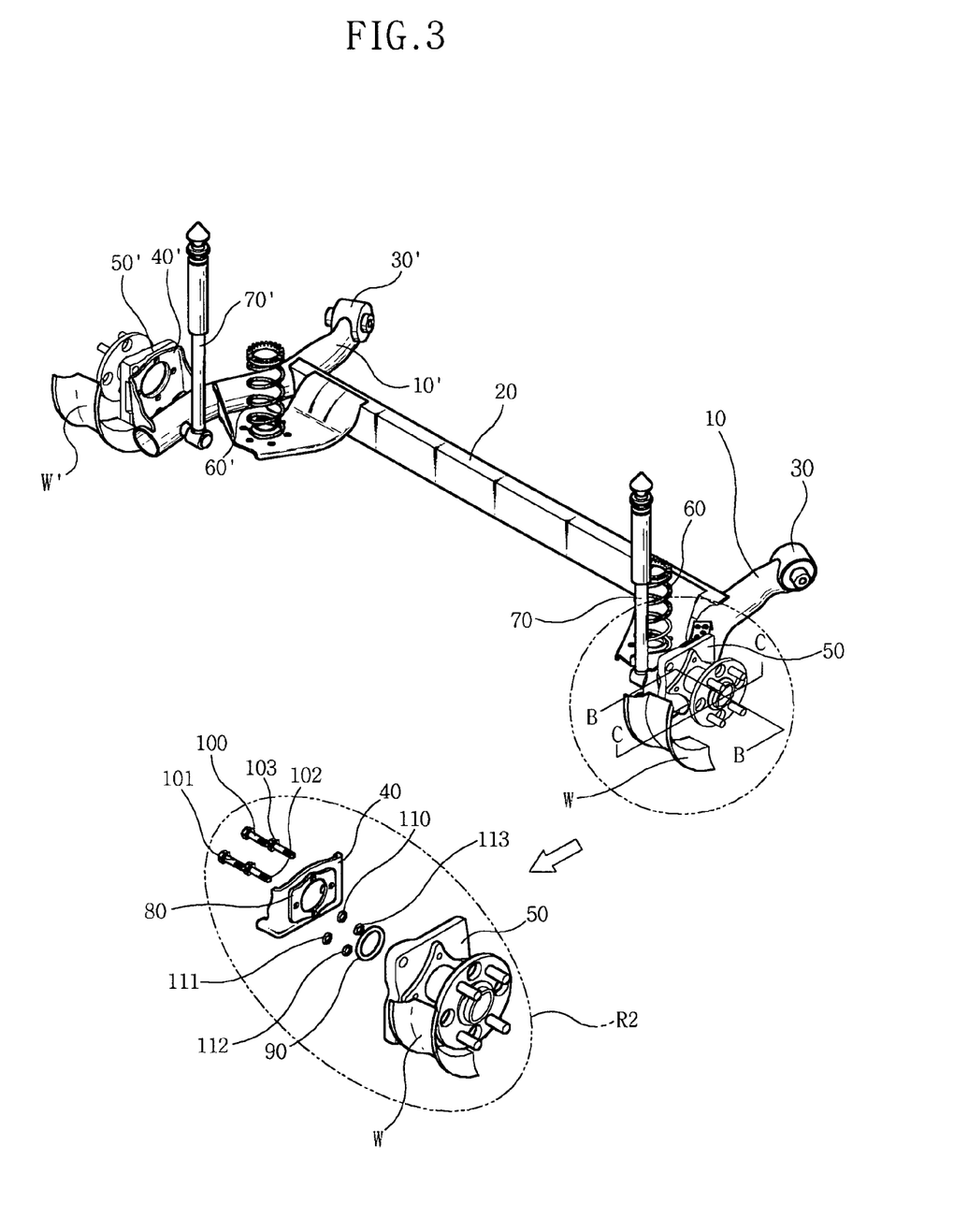
FIG. 3 is a torsion beam suspension system having a wheel angle adjustment apparatus according to a preferred embodiment of the present invention.
Figure 4:
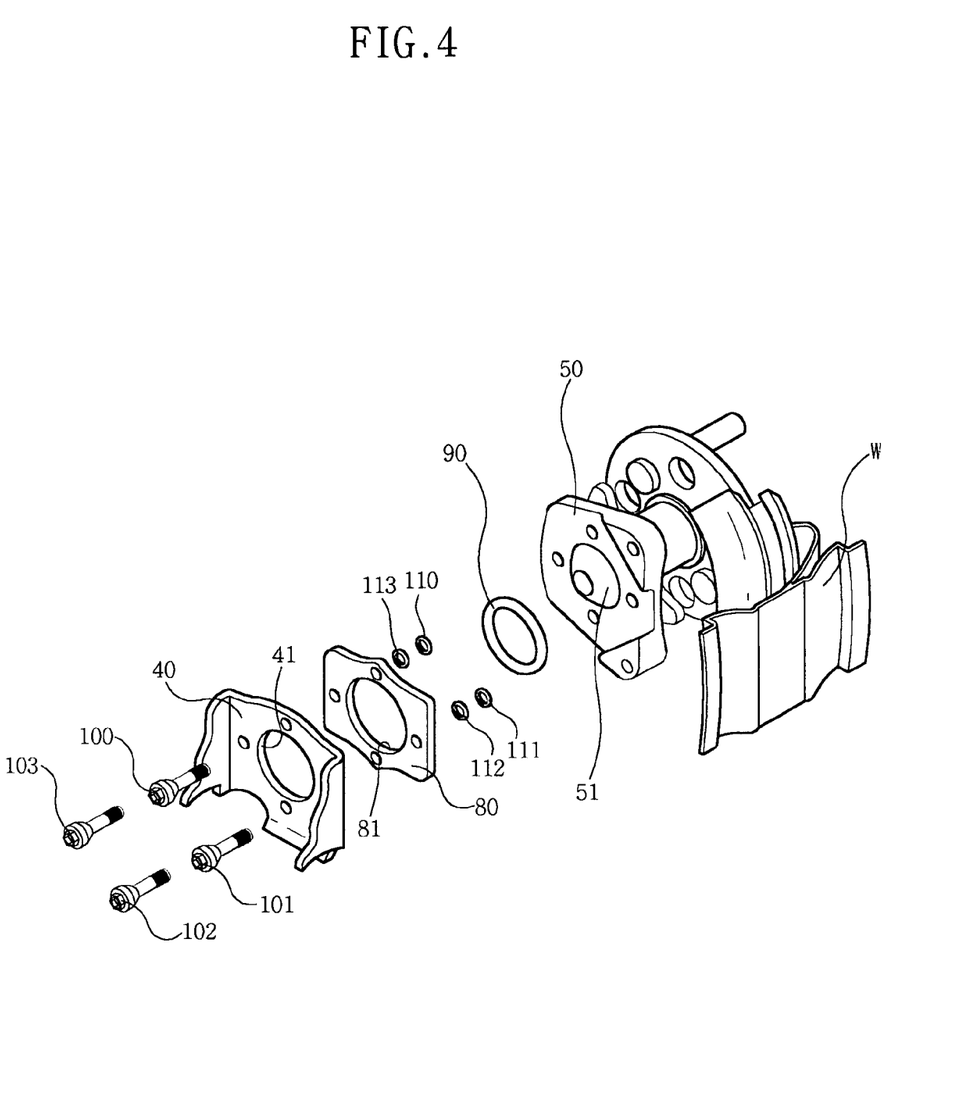
FIG. 4 is an exploded perspective view showing the portion R2 of FIG. 3 from a different angle.
Figure 5:
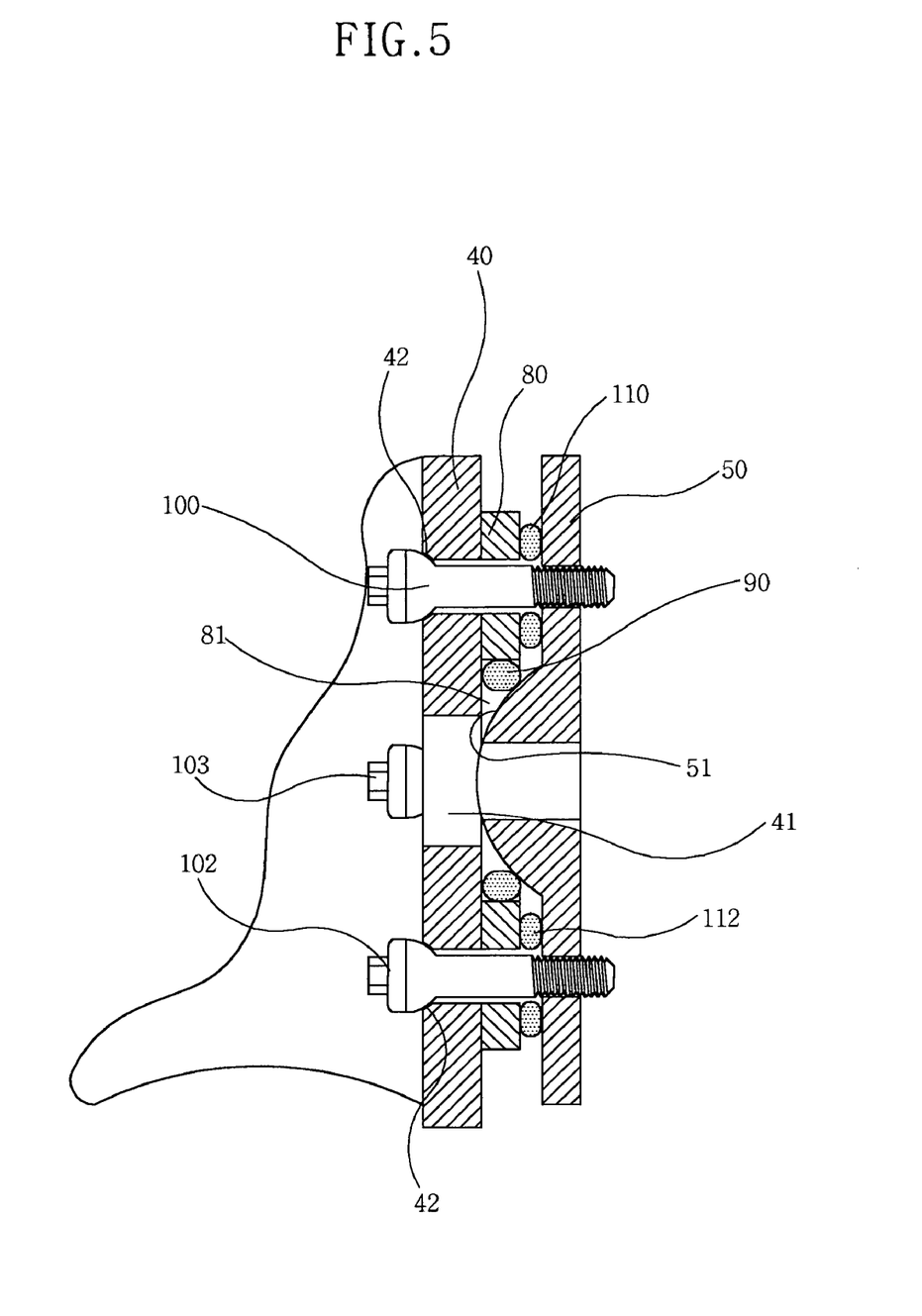
FIG. 5 is a sectional view taken along the line B-B of FIG. 3.
Figure 6:
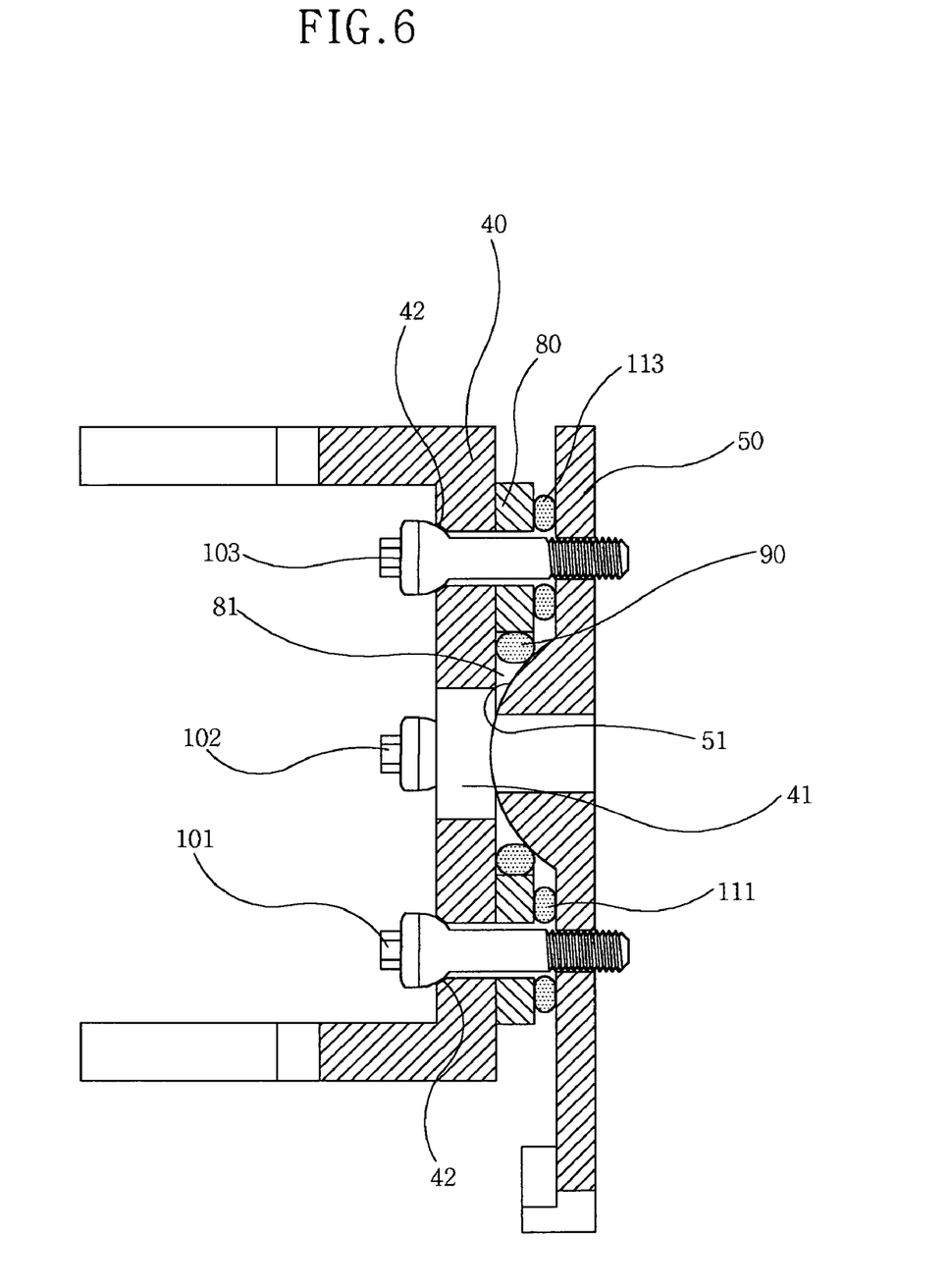
FIG. 6 is a sectional view taken along the line C-C of FIG. 3.

FIG. 3 is a torsion beam suspension system having a wheel angle adjustment apparatus according to the preferred embodiment of the present invention. FIG. 4 is an exploded perspective view showing the portion R2 of FIG. 3 from a different angle. FIG. 5 is a sectional view taken along the line B-B of FIG. 3. FIG. 6 is a sectional view taken along the line C-C of FIG. 3.

As shown in FIGS. 3 through 6, in the torsion beam suspension system having the wheel angle adjustment apparatus of the present invention, two trailing arms 10 and 10' are coupled to each other by a torsion beam 20. Two joints 30 and 30', each having a bushing, are provided on front ends of the trailing arms 10 and 10', respectively. The front end of each trailing arm 10, 10' is pivotably mounted to an automobile body (not shown) through each joint 30,30'.

Furthermore, a spindle bracket 40, 40' is welded to a rear end of each trailing arm 10, 10'. A wheel W, W' is coupled to each spindle bracket 40,40' by a wheel bracket 50, 50'.

Moreover, a suspension spring 60, 60' is provided between the automobile body and each trailing arm 10, 10'. A shock absorber 70, 70' is provided on the rear end of each trailing arm 10, 10' at a position spaced apart from each spindle bracket 40, 40' by a predetermined distance.

In the preferred embodiment, the wheel angle adjustment apparatuses, which are provided on opposite first and second ends of the torsion beam 20, have the same structure. Therefore, for ease of description, only the wheel angle adjustment apparatus that is coupled to the trailing arm 10 provided on the first end of the torsion beam 20 will be explained herein below.

The wheel bracket 50 has a slide coupling part 51 which has a hemispherical shape and protrudes from the surface of the wheel bracket 50 facing the spindle bracket 40. The spindle bracket 40 has a first receiving hole 41 which is formed in the spindle bracket 40 at a predetermined position corresponding to the slide coupling part 51 and has a predetermined diameter so that a part of the slide coupling part 51 may be inserted into the first receiving hole 41.

Furthermore, an interposition plate 80 is provided between the spindle bracket 40 and the wheel bracket 50. A second receiving hole 81, having a diameter greater than the diameter of the first receiving hole 41 of the spindle bracket 40, is formed in the interposition plate 80. When the surface of the interposition plate 80 is in close contact with the surface of the spindle bracket 40, a holding region which has a concave and stepped shape is defined by the first and second receiving holes 41 and 81 of the spindle bracket 40 and the interposition plate 80. The slide coupling part 51 is rotatably seated in the holding region.

Here, a friction reduction unit is provided between the slide coupling part 51 of the wheel bracket 50 and the interposition plate 80. A ring 90 is used as the friction reduction unit.

The spindle bracket 40, the wheel bracket 50 and the receiving plate 80 are coupled together by a plurality of locking bolts 100, 101, 102 and 103 which are tightened into them. It is preferable that the number of locking bolts be four or more to adjust a toe angle and camber angle of the wheel W.

As in the preferred embodiment, in the case that four locking bolts 100, 101, 102 and 103 are used, lines that connect the tightened locking bolts 101, 101, 102 and 103 define a regular square.

Each locking bolt 100, 101, 102, 103 is a countersunk head bolt, a head part of which is rounded at a lower portion thereof. The spindle bracket 40 has a plurality of concave bolt seats 42 at predetermined positions so that the head part of each locking bolt 100, 101, 102, 103 is seated in each concave bolt seat 42.

Furthermore, an elastic spacer is provided on each locking bolt 100, 101, 102, 103 between the spindle bracket 40 and the wheel bracket 50. Thus, due to the elastic spacers, even if the locking bolts 100, 101, 102 and 103 are not maximally tightened, the bolt coupling between the spindle bracket 40 and the wheel bracket 50 is not loosened.

In the preferred embodiment, a plurality of elastic rubber rings 110, 111, 112 and 113 is used as the elastic spacers. The elastic rings 110, 111, 112 and 113 are respectively fitted over the circumference of the locking bolts 100, 101, 102 and 103.

The operation and effect of the present invention having the above-mentioned construction will be described in detail with reference to the attached drawings.

Figure 7:
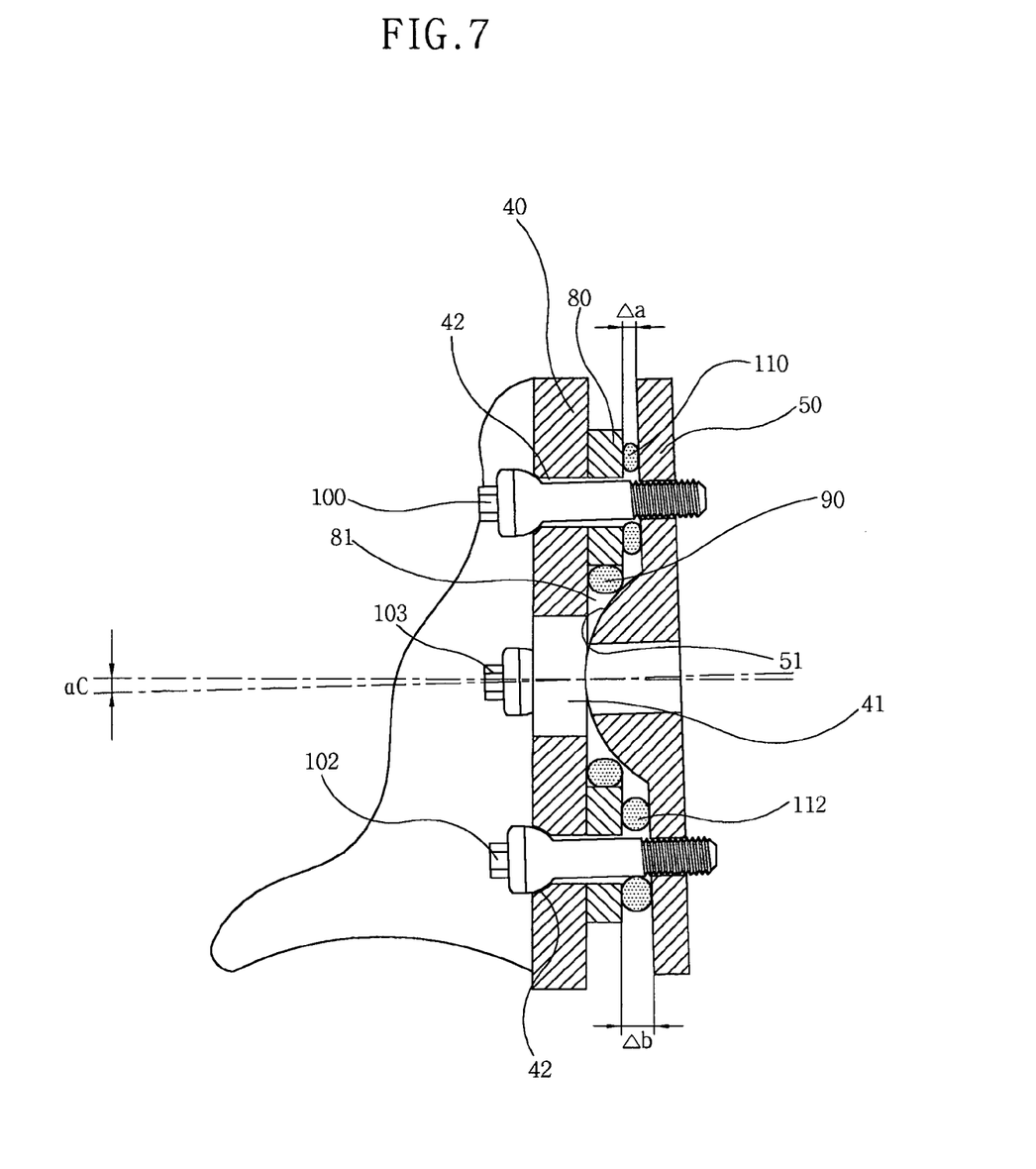
FIGS. 7 and 8 are sectional views corresponding to FIG. 5 to show camber angles adjusted by the wheel angle adjustment apparatus according to the present invention.

To adjust the camber angle of the wheel from the initial state of FIGS. 5 and 6, as shown in FIG. 7, if the upper locking bolt 100, placed at a high position on an axis passing vertically through the center of the spindle bracket 40 in the height direction of the automobile, is further tightened and the lower locking bolt 102, placed at a low position, is loosened a little, an upper gap Δa between the spindle bracket 40 and the wheel bracket 50 is reduced, and a lower gap Δb between them is increased, thus the camber angle αC is changed. For reference, according to the circumstances, the left locking bolt 103 or the right locking bolt 101 may also have to be tightened or loosened.

Figure 8:
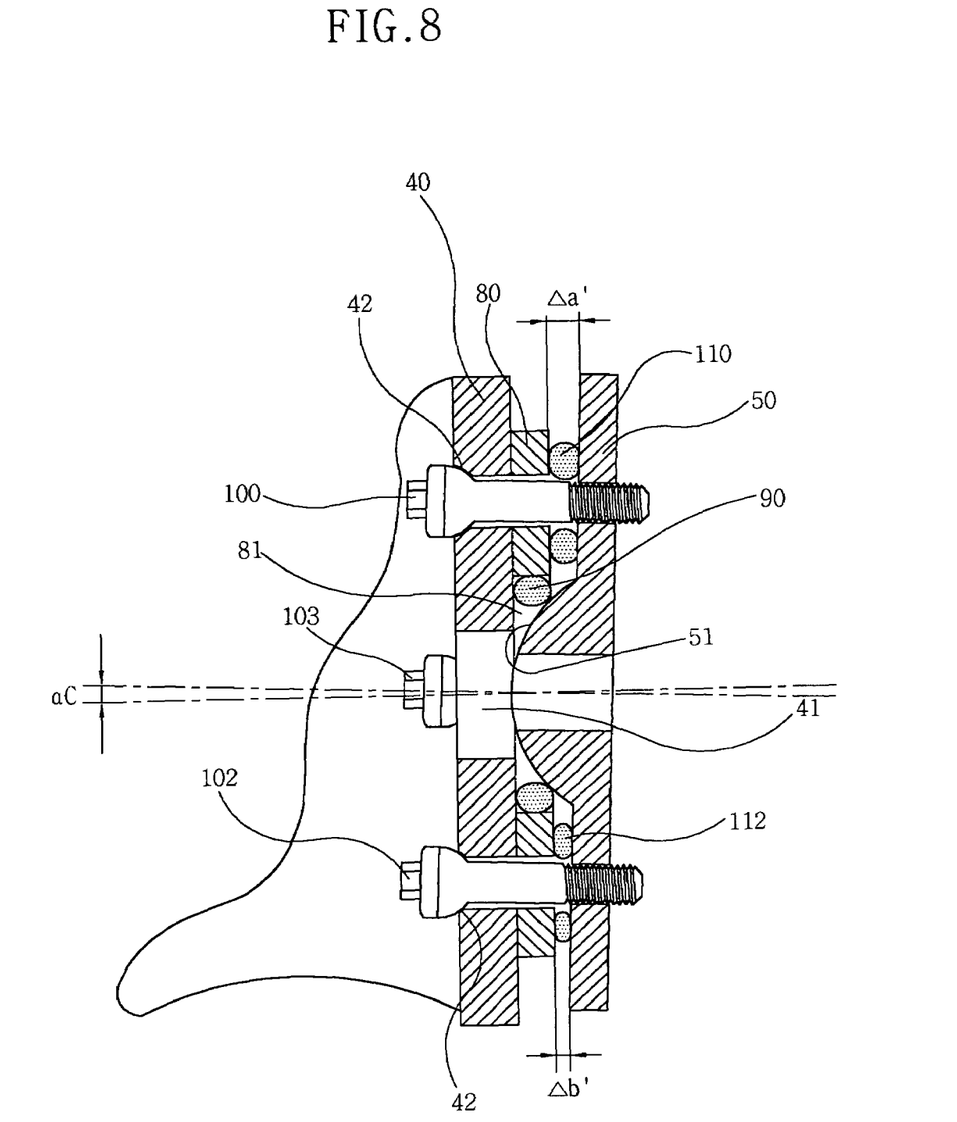

To change the camber angle αC of the wheel W in a direction opposite to the above case, as shown in FIG. 8, the upper locking bolt 100, placed at the high position on the axis vertically passing through the center of the spindle bracket 40, is loosened a little, and the lower locking bolt 102, placed at a low position with respect to the upper locking bolt 100, is further tightened. Then, the upper gap Δa' between the spindle bracket 40 and the wheel bracket 50 is increased, and a lower gap Δb' between them is reduced. As a result, the camber angle αC is changed in the direction opposite to that of the above case.

Figure 9:
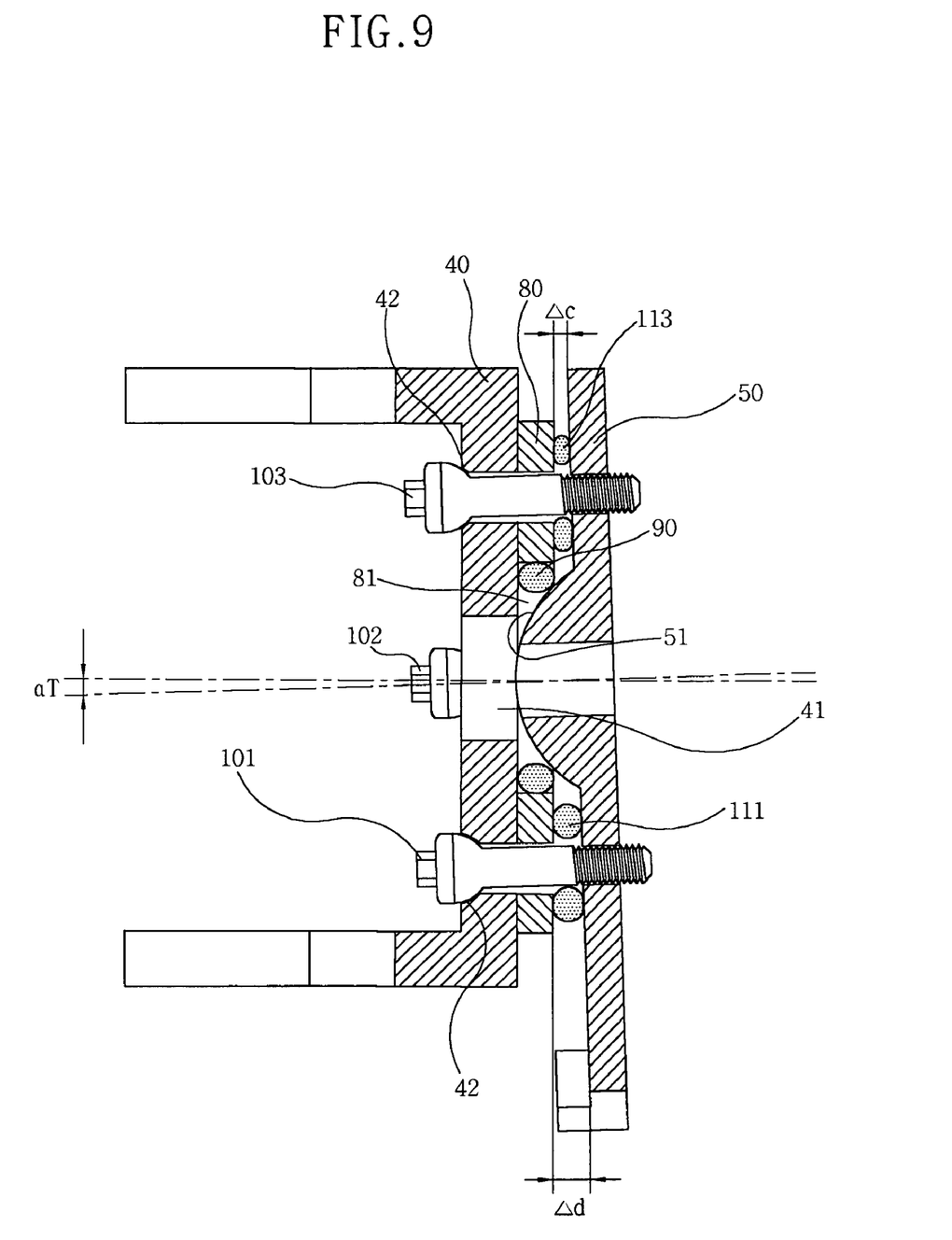
FIGS. 9 and 10 are sectional views corresponding to FIG. 6 to show toe angles adjusted by the wheel angle adjustment apparatus according to the present invention.

When it is desired to adjust the toe angle αT of the wheel, as shown in FIG. 9, if the left locking bolt 103, located to the left of the axis passing vertically through the center of the spindle bracket 40, is further tightened and the right locking bolt 101, located to the right of the left locking bolt 103, is loosened a little, a left gap Δc between the spindle bracket 40 and the wheel bracket 50 is reduced, and a right gap Δd between them is increased. Thus, the toe angle αT of the wheel W is changed in a desired direction. For reference, according to the circumstances, the upper locking bolt 100 or the lower locking bolt 102 may also have to be tightened or loosened.

Figure 10:
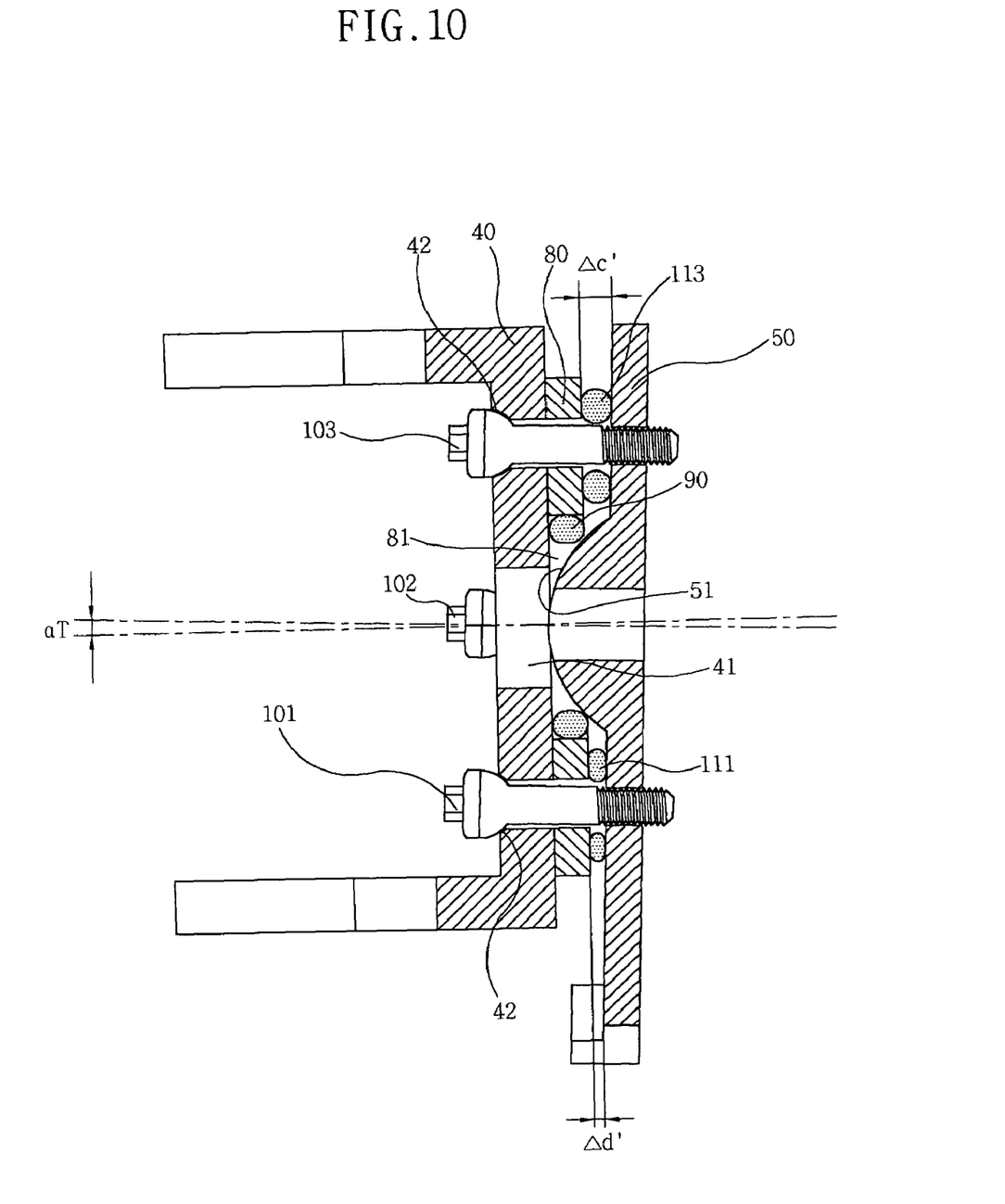

To change the toe angle αT of the wheel W in the direction opposite to that of the above case, as shown in FIG. 10, the left locking bolt 103, located to the left of the axis passing vertically through the center of the spindle bracket 40, is loosened a little and the right locking bolt 101, located to the right of the left locking bolt 103, is further tightened. Then the left gap Δc' between the spindle bracket 40 and the wheel bracket 50 is increased, and the right gap Δd' between them is reduced. Thus, the toe angle αT of the wheel W is changed in a direction opposite to that of the above case.

Here, because the slide coupling part 51 of the wheel bracket 50 has a hemispherical shape, the wheel bracket 50 smoothly rotates in all directions. Furthermore, the ring 90, which is interposed between the slide coupling part 51 of the wheel bracket 50 and the interposition plate 80, reduces Fictional resistance during the movement of the slide coupling part 51 and, thus, makes it possible for the wheel bracket 50 to rotate more smoothly.

The elastic rubber rings 110, 111, 112 and 113, which are fitted over respective locking bolts 100, 101, 102 and 103 between the spindle bracket 40 and the wheel bracket 50, are constricted when the locking bolts 100, 101, 102 and 103 are further tightened, and the elastic rubber rings 110, 111, 112 and 113 are returned to their initial states when the locking bolts 100, 101, 102, 103 are loosened. Therefore, each locking bolt 100, 101, 102, 103 is elastically tightened or loosened. In other words, the elastic rubber rings 110, 111, 112 and 113 serve to prevent the bolt coupling from being undesirably loosened when the upper gap Δa, the lower gap Δb, the left gap Δc or the right gap Δd between the spindle bracket 40 and the wheel bracket 50 is changed by tightening or loosening the locking bolts 100, 101, 102 and 103.

Meanwhile, when the upper gap Δa, the lower gap Δb, the left gap Δc or the right gap Δd between the spindle bracket 40 and the wheel bracket 50 is changed by tightening or loosening the locking bolts 100, 101, 102 and 103, the axes of the locking bolts 100, 101, 102 and 103 may become misaligned. Therefore, gaps may occur between the head parts of the locking bolts 100, 101, 102, and 103 and the spindle bracket 40.

However, in the present invention, each locking bolt 100, 101, 102, 103 is a countersunk head bolt, and the concave bolt seats 42 are formed at predetermined positions on the spindle bracket 40 such that the head part of each locking bolt 100, 101, 102, 103 is seated in each concave bolt seat 42. Therefore, even if the axes of the locking bolts 100, 101, 102 and 103 are misaligned, the lower surface of the head part of each locking bolt 100, 101, 102, 103 engages with the inner surface of the associated concave bolt seat 42 while the head part moves in the inner surface of the concave bolt seat 42. Thus, no gap exists between the spindle bracket 40 and the head parts of the locking bolts 100, 101, 102 and 103.

As described above, the present invention provides a wheel angle adjustment apparatus for an automobile suspension system in which an upper gap, a lower gap, a left gap and a right gap between a spindle bracket and a wheel bracket may be adjusted by tightening or loosening a plurality of locking bolts that couples the spindle bracket and the wheel bracket together. Therefore, the toe angle and camber angle of a wheel can be easily adjusted by a simple manipulation of tightening or loosening the locking bolts.

In particular, when the present invention is used in a suspension system such as a torsion beam suspension system which has a structure such that wheel alignment using a connection part provided between the automobile body and wheels is impossible, the wheels are easily aligned merely by adjusting the gap between the spindle bracket and the wheel bracket.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A wheel angle adjustment apparatus for an automobile suspension system provided with both a wheel bracket and a spindle bracket coupled to the wheel bracket, wherein the wheel angle adjustment apparatus comprises:

a slide coupling part having a rounded shape and protruding as one body from either a surface of the spindle bracket facing the wheel bracket or a surface of the wheel bracket facing the spindle bracket;

a holding region provided on a remaining one of the surface of the spindle bracket facing the wheel bracket and the surface of the wheel bracket facing the spindle bracket, so that the slide coupling part is rotatably seated in the holding region;

a plurality of locking bolts tightened into both the spindle bracket and the wheel bracket to couple the spindle bracket and the wheel bracket together; and an elastic spacer provided on each of the plurality of locking bolts between the spindle bracket and the wheel bracket.

2. The wheel angle adjustment apparatus as set forth in claim 1, wherein the slide coupling part has a hemispherical shape.

3. The wheel angle adjustment apparatus as set forth in claim 1, wherein the holding region comprises:

a first receiving hole formed in the spindle bracket;

an interposition plate provided between the spindle bracket and the wheel bracket, with a second receiving hole formed in the interposition plate, the second receiving hole having a diameter greater than a diameter of the first receiving hole of the spindle bracket and communicating with the first receiving hole.

4. The wheel angle adjustment apparatus as set forth in claim 3, wherein the holding region further comprises:

a friction reduction unit provided between the slide coupling part of the wheel bracket and the interposition plate.

5. The wheel angle adjustment apparatus as set forth in claim 4, wherein the friction reduction unit comprises a ring.

6. The wheel angle adjustment apparatus as set forth in claim 1, wherein the elastic spacer comprises an elastic ring fitted over a circumference of each of the plurality of locking bolts.

7. The wheel angle adjustment apparatus as set forth in claim 1, wherein each of the locking bolts comprises a countersunk head bolt, a head part of which is rounded at a lower portion thereof, and either the spindle bracket or the wheel bracket comprises a plurality of concave bolt seats at predetermined positions so that the head part of each of the locking bolts is seated in each of the concave bolt seats.

* * * * *